Aug. 23, 1932.   G. C. THOMAS, JR   1,873,509
BOX AND FIXTURE SUPPORT
Filed Aug. 16, 1930
FIG.1.
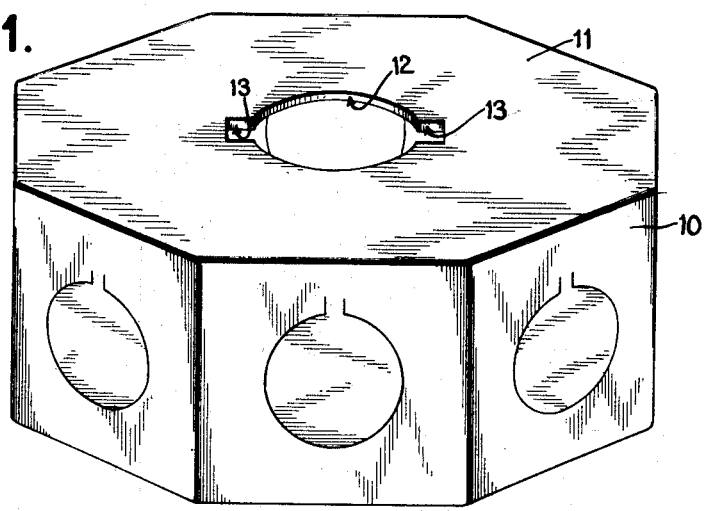
FIG.2.
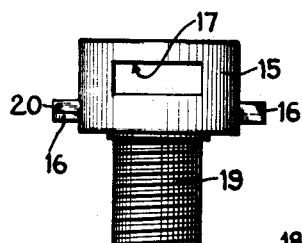
FIG.4.
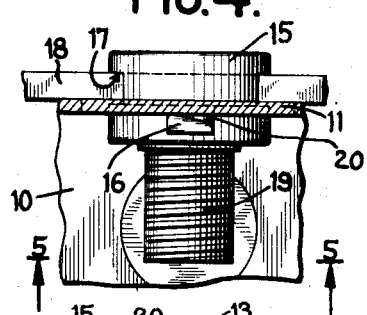
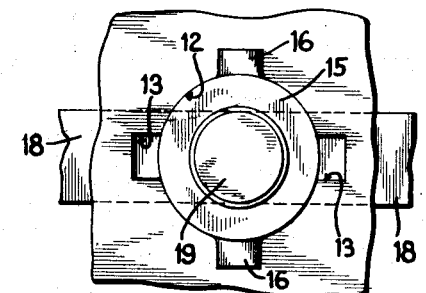
FIG.5.
FIG.3.
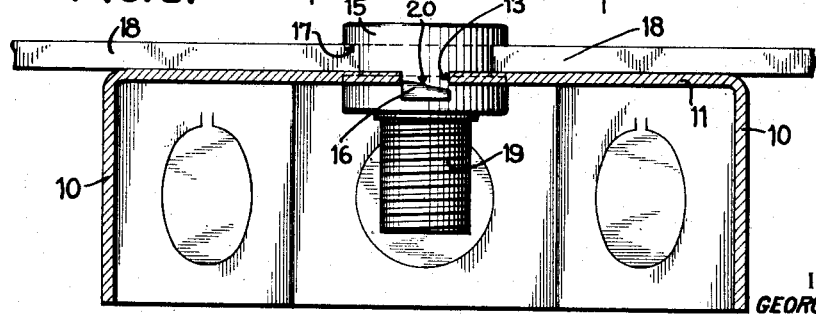
INVENTOR
GEORGE C. THOMAS JR.
BY ATTORNEY
John M. Montstream Patented Aug. 23, 1932

1,873,509

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

BOX AND FIXTURE SUPPORT

Application filed August 16, 1930. Serial No. 475,718.

This invention relates to wall assemblies in which an opening is provided in a wall and anchorage means are secured therein. The opening and anchorage means are so constructed that upon insertion of the anchorage means within the opening and relative rotation between the anchorage means or anchorage parts carried thereby and the wall, the anchorage parts are brought into engagement with the box wall and securely clamp the anchorage means in the opening.

The invention includes a construction of opening in a wall, such as the wall of an outlet box, so that the invention not only pertains to a wall assembly but also to a box wall having an opening of the type to be described. The means or supporting device which are anchored or secured within the opening, are also designed to be inserted in the opening provided in the wall in accordance with the invention so that this means or supporting device is also a separate and distinct part of the invention.

It is an object of the invention to construct a wall assembly consisting of a wall such as the wall of an outlet box provided with an opening therethrough of a particular form and anchorage or supporting device having means which are insertable through the opening and engage the box wall to secure the anchorage or supporting device within the opening.

Another object of the invention is to provide an outlet box having a new and novel type of opening through its wall.

Another object of the invention is to construct means, such as a fixture supporting device for outlet boxes, which is constructed to be inserted within the opening in the box and having means carried by the device which engages the wall of the box upon relative rotation therebetween to secure the device within the opening.

Other objects of the invention will be more apparent from the following description taken in connection with the accompanying drawing in which:

Figure 1 is a perspective view of an outlet box in the bottom wall of which is provided an opening in accordance with the invention.

Figure 2 shows a fixture supporting device constructed to be inserted and anchored in the opening in the wall shown in Figure 1.

Figure 3 is a section through the outlet box of Figure 1 with the supporting device inserted in the opening prior to its being anchored therein.

Figure 4 is a partial section through the outlet box showing the supporting device anchored within the opening in the outlet box.

Figure 5 shows the supporting device anchored within the opening in the box as viewed from the inside of the box or taken from line 5—5 of Figure 4.

This invention provides an opening in a wall, such as the opening in a wall of an outlet box, having at least one recess in the edge of the opening. A device, such as a fixture supporting means, is then adapted to be anchored within the opening. This device projects through the opening and carries at least one wall engaging member or means which engages one side or face of the wall and spaced therefrom there is at least one anchorage or wedging means which passes through the recess in the side of the opening through the wall and engages the other side or face of the wall upon relative rotation between the anchorage or wedging means and the wall so that the device is anchored within the opening.

The box 10 in Figure 1, is provided in its bottom wall 11 with an opening 12. The opening 12 has a pair of recesses 13 passing through the wall 11 and at the edge of the opening 12. The recesses, when two are provided, are preferably positioned diametrically opposite each other across the opening 12.

A device is then anchored within the opening 12, such as a fixture supporting device or means, shown in Figure 2. This fixture supporting device consists of a supporting member 15 provided with a pair of projections 16 extending from the side thereof and having a length and width less than the dimensions of the recesses 13 so that they may readily pass through the recesses in the edge of or forming a part of the opening 12. A passage 17 extends through the supporting member 15 and a stud 19 provides attaching means whereby other structure may be suspended from the supporting device. The passage 17 receives a hanger rod 18 by means of which the outlet box 10 is suspended from structure in the ceilings of buildings or elsewhere. The hanger rod in addition provides a wall engaging member or means for contacting with one side of the box wall and cooperates with the projections 16 to anchor the supporting device within the opening. The projections 16 are provided with an inclined surface 20 for contact with the box wall, the purpose of which will be later described.

The fixture supporting device is assembled in the box hole opening by inserting the hanger rod 18 within the passage 17 in the supporting member 15 and positioning the member thereon wherever desired. The supporting member 15 is then inserted in the opening 12 so that the projections 16 pass through the recesses 13 in the edge of the opening. The hanger rod 18 then contacts with the face of the wall 11 of the box 10 and the projections 16 are in the position shown in Figure 3 prior to any movement or any relative rotation between the projections and the box wall.

Relative rotation between the projections 16 or the supporting member and the box wall 11 of the outlet box 10 brings the inclined surface 20 of the projections 16 into contact with the box wall 11. Continued rotation between the projections 16 and the box wall 11 carries the projections 16 underneath the wall 11 so that the wall is clamped between the hanger rod 18 and the projections 16. In this rotation the inclined surface 20 on the projections 16 serves as a wedging surface and positively clamps or grips the box wall between the hanger rod 18 and the inclined or wedging surfaces of the projections 16 thereby securely anchoring the supporting device within the opening 12.

The wall assembly disclosed herein which may be the assembly of a fixture supporting device within an opening in the wall of an outlet box, provides an opening in the wall which receives the supporting device therein for limited relative rotation with the wall. The opening is formed such as by recesses so that means or projections 16 upon the supporting device are insertable through the opening or recesses and upon rotating the supporting device relatively to the wall, the projections engage the under or inner side of the wall.

The supporting device is also provided with means to engage the other or outer side of the wall which in the outlet box may be the hanger rod 18 as disclosed herein. Now either of these means which engage one or the other side of the box wall may be provided with inclined or wedging surfaces 20 facing towards the other means so that the minimum separation of the two means is less than the thickness of the wall. Upon rotation of the wedging surface relatively to the wall, the wedging surface is brought forcibly into contact with the wall, so that the supporting device is wedged or clamped within the opening.

What is claimed is:—

1. An outlet box assembly comprising a box wall having an opening therein, the edge of the opening having recesses through the wall, a supporting member anchored within the opening, a passageway extending through the supporting member, a hanger rod inserted within the passageway to engage one side of the wall and adjustable therein, projections upon the supporting member insertable through the recesses in the edge of the opening, a wedging surface upon the projections to engage the other side of the wall upon relative rotation between the projections and the wall to anchor the supporting member in the opening, the minimum spacing between the wedging surface and the hanger rod being less than the wall thickness, and means carried by the supporting member to attach other devices thereto.

2. An outlet box assembly comprising a box wall having an opening therein, the edge of the opening having recesses through the wall, a supporting member anchored within the opening, a passageway extending through the supporting member, a hanger rod inserted within the passageway to engage one side of the wall and adjustable therein, projections upon the supporting member axially spaced from the hanger rod and insertable through the recesses in the edge of the opening, a wedging surface upon the projections facing towards the hanger rod and with the minimum axial distance between the hanger rod and the wedging surface less than the thickness of the box wall to engage the other side of the box wall upon relative rotation between the wedging surface and the wall to anchor the supporting member in the opening, and means carried by the supporting member to attach other devices thereto.

3. A supporting device for a wall assembly comprising a supporting member, a passageway through the supporting member, a hanger rod slidable through the passageway, projections extending radially from the supporting member and axially spaced from the hanger rod, a wedging surface upon the projections facing towards the hanger rod and with the minimum axial distance between the hanger rod and the wedging surface being less than the thickness of the wall engaged therebetween, and means carried by the supporting member to attach other devices thereto.

In testimony whereof I affix my signature.

GEORGE C. THOMAS, Jr.